(12) United States Patent
Durette

(10) Patent No.: US 6,317,938 B1
(45) Date of Patent: Nov. 20, 2001

(54) SAFETY ACCESSORIES FOR AN ELASTIC/ HOOK COMBINATION FASTENER

(76) Inventor: Jean-Francois Durette, 1170 East Henri-Bourassa Blvd., Montreal, Quebec (CA), H2C1G4

( * ) Notice: Subject to any disclaimer, the term of this patent is extended or adjusted under 35 U.S.C. 154(b) by 0 days.

(21) Appl. No.: 09/435,846

(22) Filed: Nov. 18, 1999

(51) Int. Cl.[7] .................................................. A44B 21/00
(52) U.S. Cl. .............................. 24/298; 24/300; 24/301; 24/302
(58) Field of Search .................................... 24/3.11, 3.12, 24/3.13, 68 AS, 68 CD, 68 R, 131, 164, 165, 198–200, 265 H, 265 AL, 265 CD, 265 BC, 265 EC, 298, 300–302, 343, 369, 370

(56) References Cited

U.S. PATENT DOCUMENTS

| | | | |
|---|---|---|---|
| D. 275,647 | 9/1984 | Blodgett | D8/372 |
| D. 307,705 | 5/1990 | Mair | D8/367 |
| D. 409,899 | 5/1999 | Schrader | D8/367 |
| 3,718,947 * | 3/1973 | Huber | 24/73 HH |
| 3,874,776 | 4/1975 | Seron | 351/123 |
| 3,891,257 * | 6/1975 | Wilson | 292/262 |
| 4,071,913 | 2/1978 | Rector | 2/20 |
| 4,159,792 * | 7/1979 | Siegal | 224/267 |
| 4,340,998 | 7/1982 | Liberge | 24/130 |
| 4,432,121 | 2/1984 | Dupre | 24/343 |
| 4,622,724 | 11/1986 | Dupre | 24/130 |
| 4,885,824 * | 12/1989 | Schwab et al. | 24/17 B |
| 4,905,321 | 3/1990 | Walunga | 2/161 |
| 4,991,236 * | 2/1991 | Pritchett | 2/189 |
| 5,229,178 * | 7/1993 | Zemitis | 428/37 |
| 5,277,347 * | 1/1994 | Savard | 224/103 |
| 5,375,263 | 12/1994 | Cuccia | 2/158 |
| 5,551,086 | 9/1996 | Albanese | 2/158 |
| 5,784,760 * | 7/1998 | Leitzke et al. | 24/3.13 |
| 5,797,167 * | 8/1998 | Schwab | 24/16 R |
| 6,014,794 * | 1/2000 | McCoy | 24/300 |
| 6,038,745 * | 3/2000 | Rapp | 24/68 R |

FOREIGN PATENT DOCUMENTS 597 010 * 3/1978 (CH) .

* cited by examiner

*Primary Examiner*—Lynne H. Browne
*Assistant Examiner*—Ruth C. Rodriguez
(74) *Attorney, Agent, or Firm*—James C. Nemmers; Douglas J. Stilwell

(57) ABSTRACT

The disclosed invention is a protective device for use in combination with an elastic strap. Such straps commonly have hooks or other fasteners mounted on ends of the strap. When stretched and then released, these fasteners may become dangerous projectiles. In order to limit the rate of retraction or recoil of such elastic straps, the present invention discloses tethering the fastener end to the user's arm and/or retarding the motion of the strap with a sheath. In addition, the disclosure demonstrates a shielding apparatus to prevent direct contact with the fastening device or hook.

16 Claims, 6 Drawing Sheets

SAFETY ACCESSORIES FOR AN ELASTIC/HOOK COMBINATION FASTENER

BACKGROUND OF THE INVENTION

This invention is an improvement upon elastic straps, cords, and tie-downs. Elastic cords or straps of various types exist for a variety of uses. For example, "Bungee" type cords or straps are commonly used to secure loads in or on vehicles. Heavy duty straps are commonly used to secure loads on trucks or to secure a cover on a load. In addition, such straps are commonly used to secure packages or crates to one another. These are merely examples of the infinite variety of situations where such straps may be used. These straps typically are provided with a hook or fastener on at least one end. Due to the elastic nature of the straps and their use in tying down articles, the straps stretch to great lengths placing them under tremendous pressures. If the strap or fastener fails, or if the user loses grip on the fastener during use, the sudden release makes the hook or fastener a dangerous projectile. Numerous individuals have suffered serious injury including the loss of eyes, disfigurement of the face, and even death.

The present state of the art includes elastic straps with adjustable hooks or fasteners that can be moved to various locations on the strap. A movable fastener allows the user to adjust the length of the strap to avoid the over-stretching and building-up of great force that supports a strong recoil of the strap. Other safety mechanisms include fasteners with safety tongs to prevent the hook from slipping once it is securely affixed. However, these safety mechanisms do not serve to restrain a flying hook or fastener once the user's or the hook's grip has been lost. There is therefore a need for an invention that will aid in the prevention of injury from released hooks and fasteners that, otherwise, pose a grave danger to the users.

SUMMARY OF THE INVENTION

The present invention is a safe elastic strap and a protective attachment for application with elastic straps. The attachment may be either a loop, a protective sheath, a fastener shield, or a combination of these.

In the loop embodiment, the loop is placed in a location such that a user may insert his/her hand, wrist, or arm through the loop while griping the strap or fastener to stretch the strap and attach the fastener. In this fashion, if the strap or the user's grip fails, the loop serves as a tether and limits the distance that the strap and hook or fastener may recoil. This prevents the strap end, hook, or fastener from striking a user in the head, face, or neck where serious injury may result. The invention may be a separate loop attached, directly or indirectly, to the strap, or attached, directly or indirectly, to the fastening device or hook. The device of the invention may also have a portion of the strap itself isolated as a loop through the use of a knot, crimping device, or threading device. Due to the broad array of elastic straps (e.g., anchored tied downs with one free end, simple two ended straps, multi-stranded "spider straps" that contain numerous interconnected strands and ends, etc.) and in order to provide safety to the large number of straps already in use, the protection attachment may be removably or permanently attached to the elastic strap. This allows the invention to be used as either an add-on, aftermarket product or as an accessory or as part of an originally manufactured strap.

The embodiment employing a sheath is a sheath extending over a length of the elastic strap. The recoiling strap draws itself into the sheath upon release, thus limiting the range of motion of the recoiling strap, drawing the fastener or hook into contact with the sheath, and providing a bumper for the fastener or hook. The embodiment employing a shield is similar to the sheath embodiment in that a shield partially covers the fastener or hook. As with the sheath embodiment, the recoiling strap draws the fastener or hook into the shield. The shield embodiment provides protection against direct contact with the fast moving fastener or hook.

It will be apparent to persons of ordinary skill in the art that these various embodiments are non-limiting and that they may be used separately or in combination as redundant safety systems.

DESCRIPTION OF THE PREFERRED EMBODIMENTS OF THE INVENTION

Figure 1:
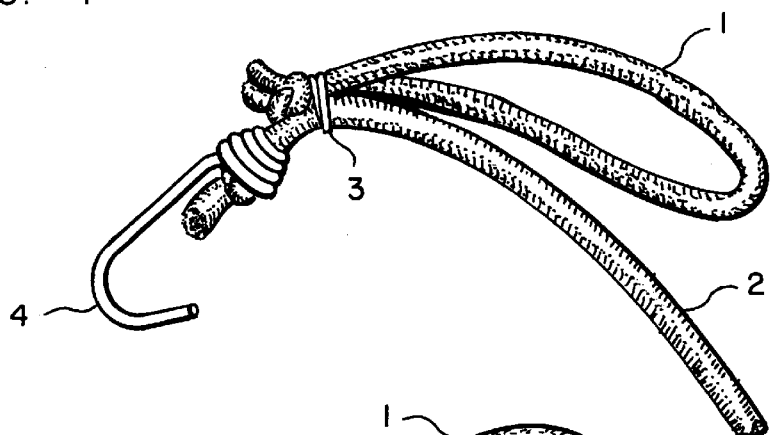
FIG. 1 is an embodiment of the invention showing a protective loop attached to a relaxed strap near a fastening end.
Figure 2:
FIG. 2 is a view showing the protective loop attached to a taut strap.
Figure 3:
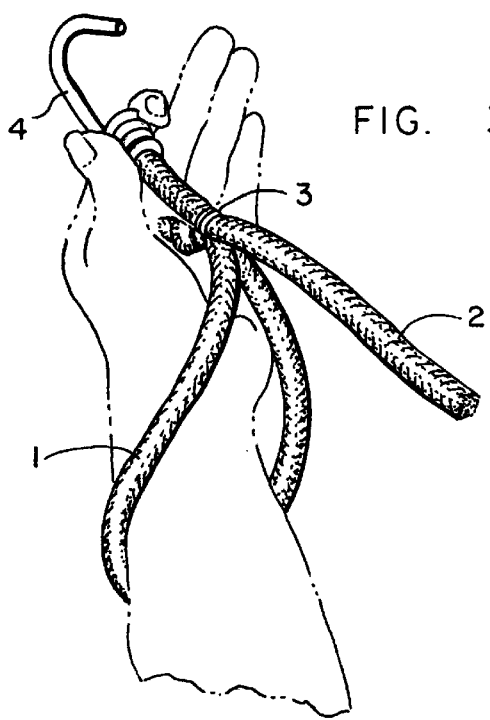
FIG. 3 is a view showing a user's arm inserted through a protective loop during manipulation of a fastening end.
Figure 4:
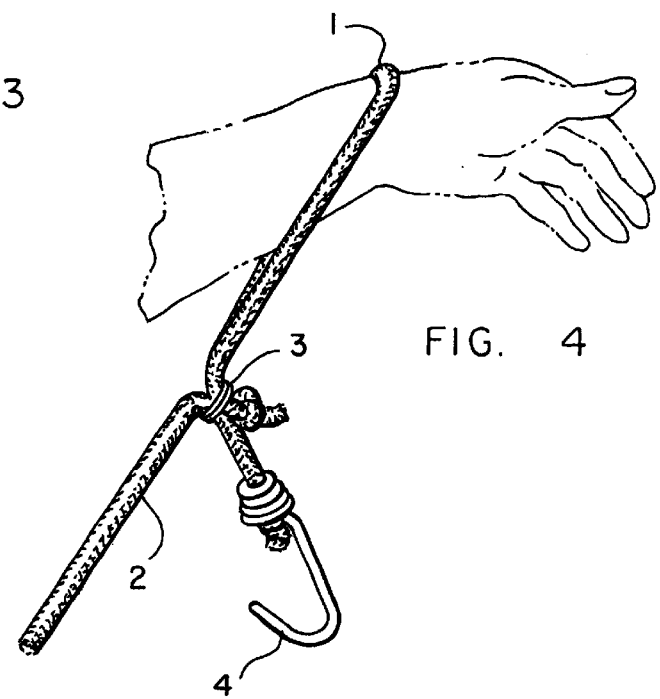
FIG. 4 is a view of the device of FIGS. 1 and 2 and showing a recoiling strap tethered to a user's arm by means of a protective loop.

FIGS. 1–4 demonstrate a first preferred embodiment of the invention. In FIGS. 1–4, a loop 1 is attached to a length of elastic strap 2. The loop 1 illustrated in FIGS. 1–4 is formed of a separate length of strap and is attached to the elastic strap 2 with a crimping or cinching element 3. As is well known, a hook-type fastening device 4 is suitably attached to the elastic strap 2. The crimping element 3 may be an integral part of the hook or fastener 4, or it may be a separate component as illustrated. FIGS. 3 and 4 demonstrate how a user grasps the hook 3 by placing his/her hand through the loop 1. The loop 1 is of a sufficiently small diameter and is located sufficiently near the hook 4 such that, if the elastic strap 2 is stretched and the hook 4 is released as shown in FIG. 4, the loop 1 constrains the recoil of the elastic strap 2 and hook 4. Although FIGS. 1–4 illustrate the attachment of a loop formed of a separate length of elastic strap, the present invention encompasses a design in which the loop is formed from the strap that is being constrained. A loop so formed may be isolated from the rest of the continuous length of strap by any durable means such as a knot, crimping element, or a collar as illustrated in the later embodiments described hereinafter.

In this first embodiment, the loop 1 may be detachable or permanently attached to the elastic strap 2 or hook 4. The benefit of allowing either a detachable or a permanently attached loop is that the invention may, as in the presently preferred embodiment, serve as an original part of a new elastic strap, or as an after-market add-on. Because of the great number of elastic straps currently in use without any such safety mechanisms, a removable loop will provide safety to the users of these dangerous, existing straps. Therefore, the present invention clearly encompasses an add-on loop or an elastic strap wherein the loop is part of the original product.

Figure 16:
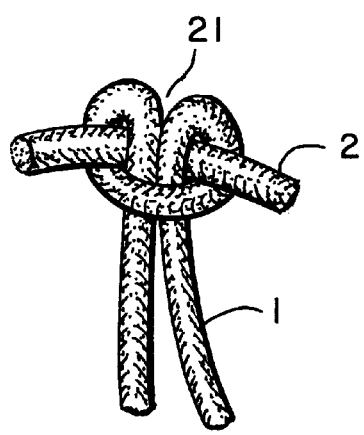
FIG. 16 is a perspective view of a portion of an elastic strap and a knot-type primary loop fastener.

FIG. 16 illustrates a detachable loop 1 that is simply knotted onto the strap 2 near the end of the strap 2 that contains the hook 4. This knotted embodiment is the most preferred embodiment due to its simple and inexpensive design. This embodiment, like the others disclosed, may be an original component of a new elastic strap or an add-on, after market accessory.

Figure 14:
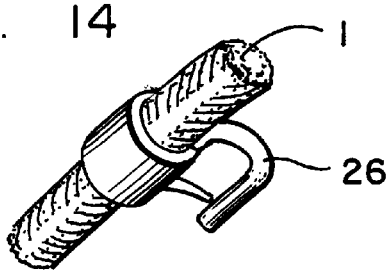
FIG. 14 is a perspective view of an independent secondary attachment loop clamp.

The loop may removably engage the elastic strap in at least one secondary location or engage the hook and the elastic strap. Embodiments wherein the loop engages the elastic strap in at least one secondary location typically have a primary attachment that uses a relatively stronger or "secure" attachment capable of holding the loop to the elastic strap during recoil of the strap, and a relatively weaker secondary attachment. The relatively weaker secondary attachment may be disengaged from the loop before use, or it may be a sacrificial attachment that automatically disengages from the strap when the strap cross-sectional diameter decreases or the strap recoils. FIG. 14 illustrates a clamp 26 for use as a removable or sacrificial attachment of the loop to the strap 2. A loop so attached allows for the convenient storage of the loop in parallel with the elastic strap, where it is less likely to catch on nearby objects when not in use. Also, if the strap is used as a tie-down for objects being carried by a vehicle, attachment of the loop will prevent the loop from flapping in the wind and creating noise while the vehicle is moving.

Figure 5:
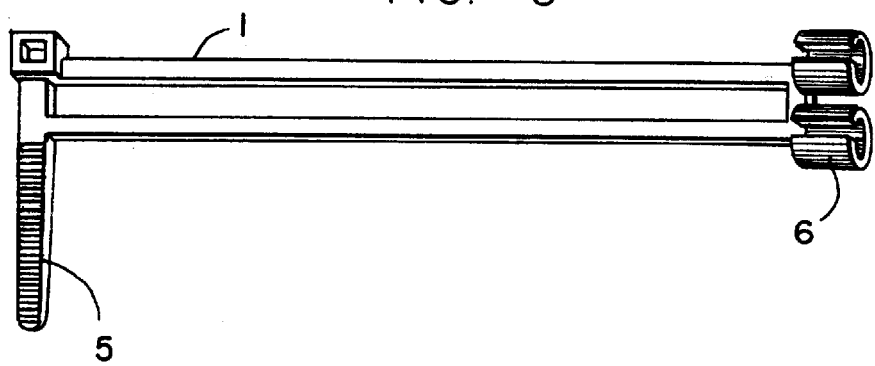
FIG. 5 is a perspective view of an embodiment of the invention showing a molded loop having a permanent tie down and detachable clamps.
Figure 6:
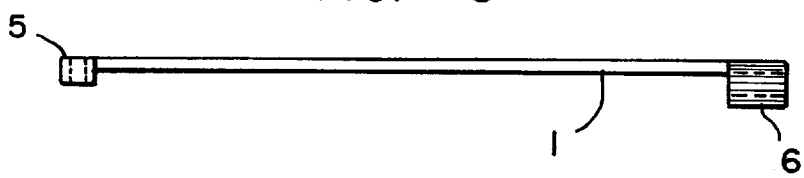
FIG. 6 is side view of the device of FIG. 5.
Figure 7:
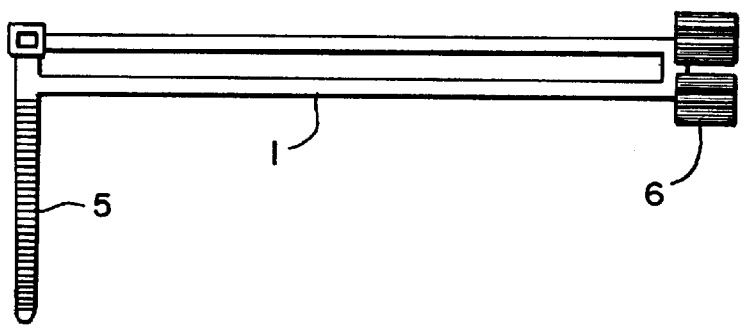
FIG. 7 is a top view of the device of FIG. 5.

In each of the variations of the second preferred embodiments illustrated in FIGS. 5–15, a molded, elastomeric, semi-rigid or rigid loop is formed. These molded loops may have any of a variety of attachment elements combined with the loop. In FIGS. 5–7, the loop 1 is permanently attached to an elastic strap 2 through the use of tie-downs 5. C-clamps 6 are provided for the secondary attachment of the loop to the elastic strap. Redundant C-clamps 6 of different diameters may be provided to allow the secure, secondary attachment of the loop to the strap 2 when the strap 2 is extended, and therefore of lesser diameter, and when the strap 2 is relaxed and of greater diameter.

Figure 8:
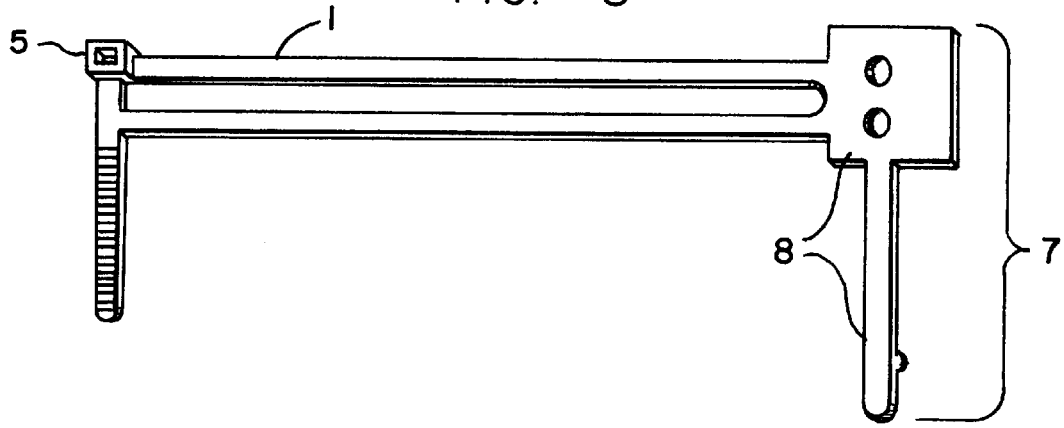
FIG. 8 is a perspective view of an embodiment of the invention similar to the embodiment of FIG. 5 and showing a molded loop having a permanent tie down and detachable strap.
Figure 9:
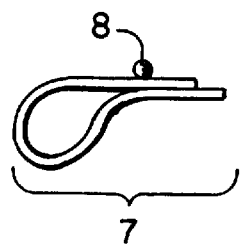
FIG. 9 is a detailed end view of the detachable strap shown in FIG. 8 and showing the male/female fastener.
Figure 10:
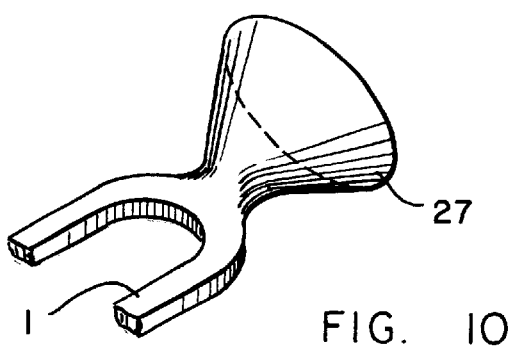
FIG. 10 is a perspective view of an embodiment of the invention showing a molded loop having a suction cup element integral with the loop for attachment to a smooth surface.
Figure 11:
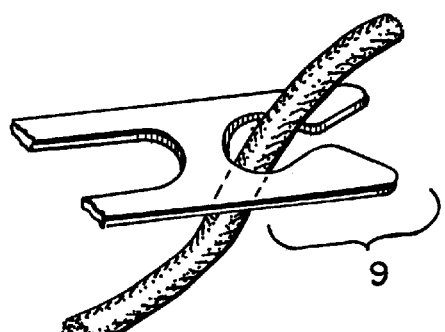
FIG. 11 is a perspective view of an embodiment of the invention showing a molded loop having a flexible pincer element combined with the loop for secondary attachment to elastic straps.
Figure 12:
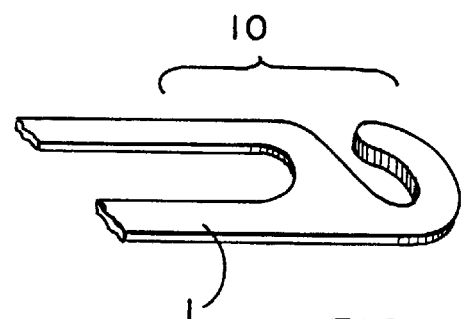
FIG. 12 is a perspective view showing the molded loop having a hook element combined with the loop for secondary attachment to elastic straps.
Figure 13:
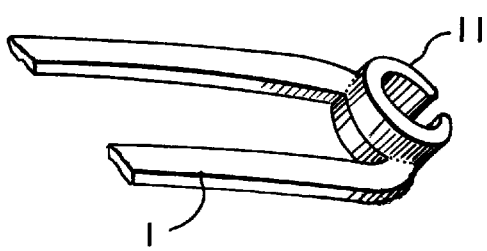
FIG. 13 is a perspective view showing the molded loop having a clamping element combined with the loop for secondary attachment to elastic straps.
Figure 15:
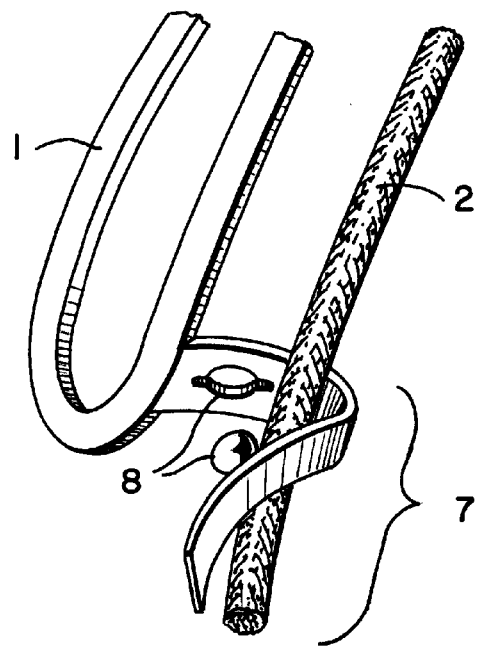
FIG. 15 is a perspective view of a loop combined with a detachable strap having a male/female fastener for secondary or primary attachment.

FIGS. 8–15 demonstrate that the secondary attachment element is not limited to C-clamps 6. In FIGS. 8, 9 and 15, the secondary attachment element is a strap 7 combined with the loop 1 and having a male/female 8 attachment means. FIGS. 10–14 demonstrate a variety of secondary attachment elements combined with a molded loop 1. FIG. 10 illustrates an elastomeric suction cup that may be attached to a smooth surface to prevent the loop from catching on nearby objects. FIG. 11 illustrates a flexible pincer 9 having a narrow throat that may be opened by bending the pincer arms. FIG. 12 demonstrates a molded, flexible hook-type fastener 10 combined with the loop 1 and having an opening sufficiently narrow to secure the loop 1 to the elastic strap 2. The opening of the flexible hook-type fastener 10 may be expanded for attachment to the elastic strap 2 by bending the hook 10. FIG. 13 illustrates that a C-clamp 11 may serve the same function as the pincer 9 or hook 10 shown in FIGS. 10 and 11 respectively.

Figure 17:
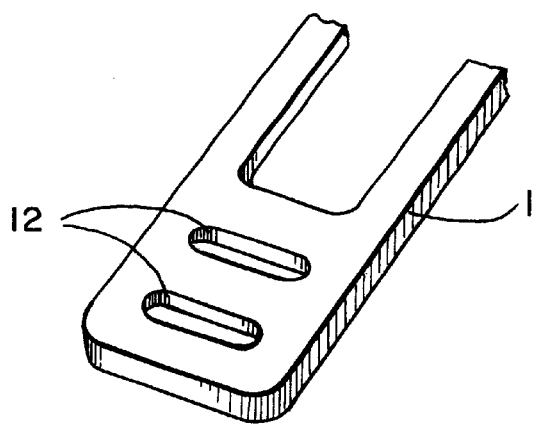
FIG. 17 is a perspective view showing a slotted, molded loop in a relaxed, unattached state.
Figure 18:
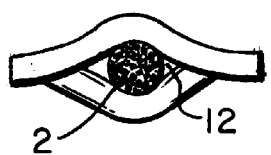
FIG. 18 is an end view showing an elastic strap inserted through the slotted, molded loop of FIG. 17.
Figure 19:
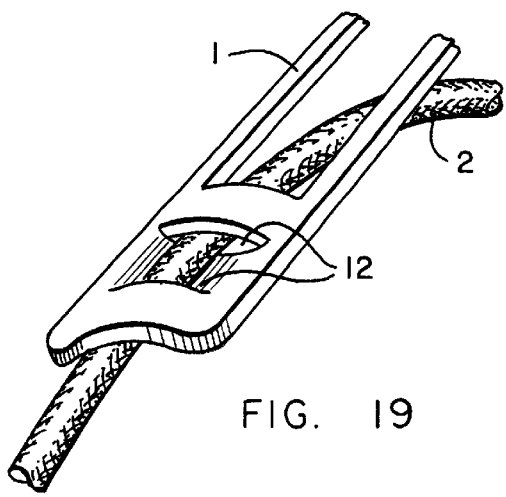
FIG. 19 is a perspective view of an elastic strap inserted through the slotted, molded loop.

FIGS. 17–19 demonstrate yet another version of the second preferred embodiment having a molded elastomeric loop 1. In these figures, the loop 1 has formed at one end a plurality of slots 12 through which the elastic strap 2 may be threaded and securely attached. It will be apparent to one skilled in the art that the slots 12 will more effectively constrain a recoiling strap 2 if the slots 12 provide a tight grip on the elastic strap 2 and do not allow the strap 2 to easily slip through the slots 12. FIG. 17 illustrates a molded loop 1 in a relaxed-state and having slots 12. FIG. 18 is an end view showing an elastic strap 2 threaded through the slots 12. FIG. 19 further illustrates the elastic strap 2 threaded through the slots 12 in the molded loop 1. The slot-type secure or primary attachments may be used in combination with any of the means for secondary attachment.

Figure 20:
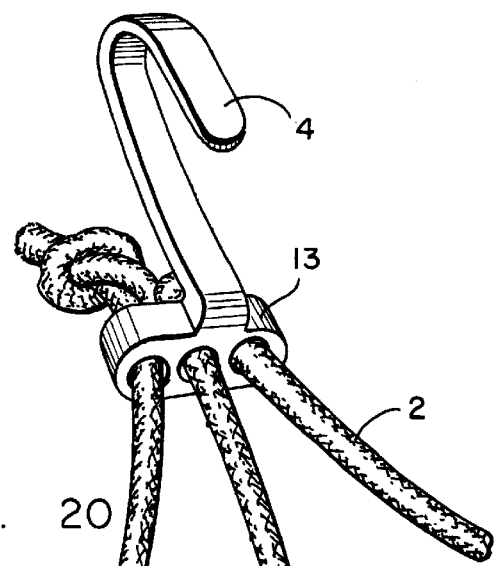
FIG. 20 is a perspective view of an embodiment showing an elastic strap threaded through a loop-forming collar.
Figure 21:
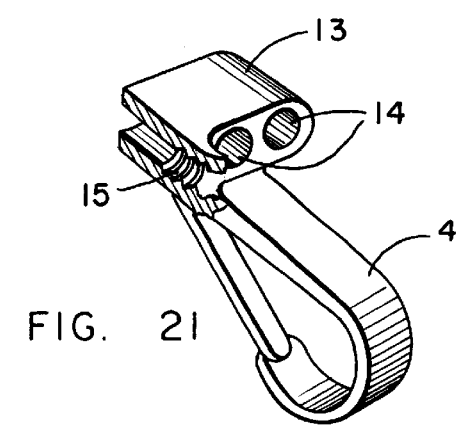
FIG. 21 is a perspective view partially cut-away to show the loop-forming collar.
Figure 23:
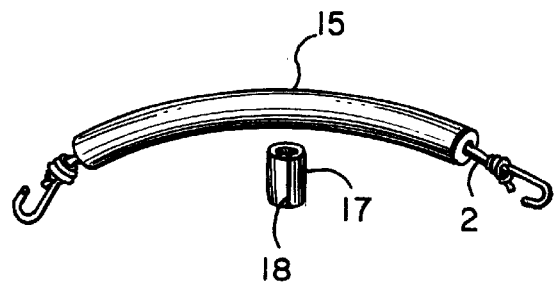
FIG. 23 is a perspective view of an embodiment and showing a single sheath elastic strap protective device.
Figure 24:
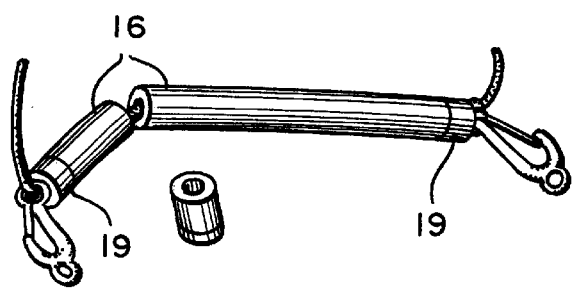
FIG. 24 is a perspective view of a capped, double sheath elastic strap protective device.
Figure 25:
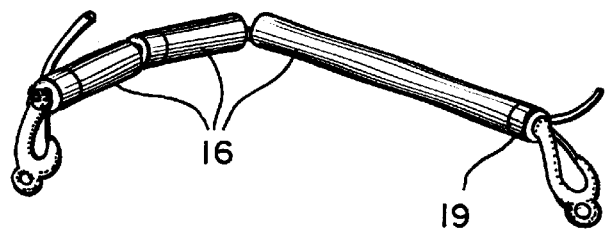
FIG. 25 is a perspective view of a capped, multiple sheath elastic strap protective device.

FIGS. 20 and 21 illustrate a third preferred embodiment wherein the tethering loop 1 may be formed of a continuous length of the elastic strap 2 that is being constrained through the use of a knot crimping element, or collar. FIGS. 20 and 21 illustrate a collar 13 with elastic straps 2 threaded through openings in the collar 13 to form a tethering loop 1. FIG. 21 illustrates that the openings in the collar 14 may contain ridges or teeth 14 to minimize slippage of the elastic strap 2 through the collar. In FIGS. 20 and 21, the collar 13 is formed integral with the fastening device or hook 4;

however, the collar 13 may be separate from these end fastening devices 4.

Figure 22:
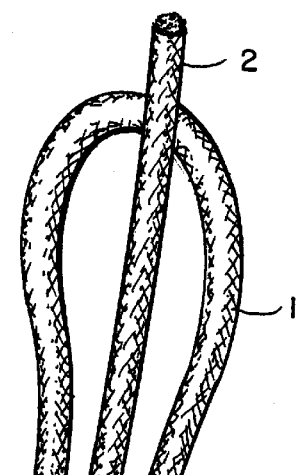
FIG. 22 is a perspective view of an embodiment and showing a combination safety hook and loop-forming collar.
Figure 22:
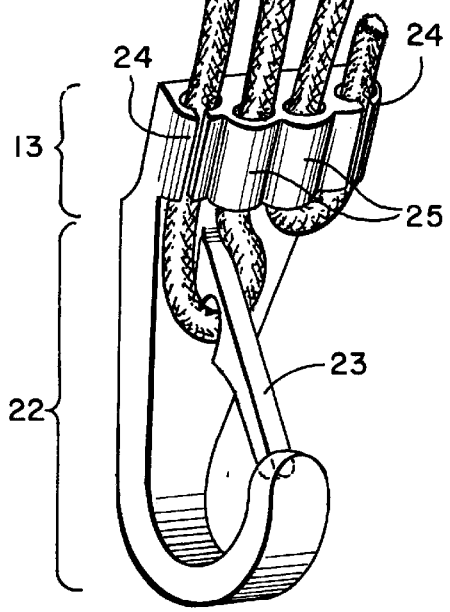

A fourth preferred embodiment of the invention combines the features of the collar-type loop forming device 13 with a safety hook 23. FIG. 22 illustrates an elastic strap safety hook 22 having a spring action tong 23 to close the hook opening and secure the hook 22 in its anchored stated. The spring action of the tong 23 is driven, in whole or in part, by the elastic strap 2, which, through the use of a collar-type loop forming device, is threaded around the tong 23.

In the embodiment illustrated by FIG. 22, the collar-type loop forming device contains anchoring channels 24 and guidance channels 25. The elastic strap 2 may be threaded through the anchoring channels 24 which are smaller in diameter than the guidance channels 25 and which pinch against the elastic strap 2 to minimize slippage. The length of elastic strap 2 isolated between the anchoring channels 24 forms the safety loop 1 described above. A length of elastic strap 2 extends from an anchoring channel 24, around the safety tong 23 and away from the collar 13. The length of strap 2 that extends away from the collar 13 is under tension while the strap 2 is stretched. This pulls the strap 2 against the tong 23 providing the spring action needed to hold the tong 23 closed both through the elastic properties of the strap 2 and through the application of pressure on the tong 23. The use of the channels 24 and 25 also provides for varying the length of the elastic strap 2 according to the needs of the user.

FIGS. 23–26 illustrate a fifth preferred embodiment. This embodiment encases the elastic strap 2 in one continuous sheath 15 or a plurality of sheaths 16. The sheath 15 or sheaths 16 shown in this fourth embodiment are longitudinally coaxial with the elastic strap 2. The sheaths 15,16 are of sufficient rigidity to effectively constrain the recoil of the elastic strap 2. For a short elastic strap 2, it may be preferable to employ only one sheath 15. However, for application with an elastic strap 2 of variable length (an elastic strap having adjustable collars or adjustable hook-ends), it is preferable to use a series of shorter sheaths 16 that may be removed to allow a shortening of the strap. Therefore, like the loops 1, the sheaths 15, 16 may be either permanently or removably affixed to the elastic strap 2. Removably affixed sheaths 17, as demonstrated in FIG. 23, will typically contain a longitudinal seam or opening 18 of sufficient strength to retard the recoil of the elastic strap 2 prior to sacrifice or detachment of the sheath 17. In order to strengthen a sheath 17 having such a seam 18, this embodiment includes sheath caps 19. These caps 19 may be perforated to allow the elastic strap 2 to pass through, or they may simply be a wrapped or sealed length of the seam 18.

Figure 26:
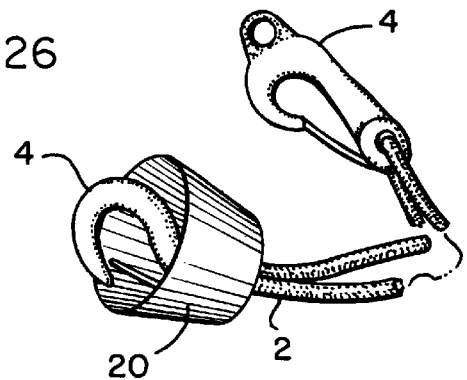
FIG. 26 is a perspective view of a shield-type elastic strap protective device.

FIG. 26 demonstrates yet another embodiment of the invention. In this embodiment, a shield 20 is used to prevent the hook or fastener 4 from directly impacting the user when the elastic strap 2 recoils. In FIG. 26, the shield 20 is placed directly on the hook or fastener 4. The shield 20 can serve the same function if it is affixed to the elastic strap 2. If affixed to the elastic strap 2, the shield 20 serves as a guard into which the hook or fastener 4 may retract if the elastic strap 2 suddenly recoils. It will be apparent to one of skill in the art that the shield 20 in this embodiment may be slidably attached to the elastic strap 2 and/or the hook or fastener 4.

It will be understood by one of ordinary skill in the art that the present invention relates to each of the above described embodiments applied individually or in any combination to enhance the safety of elastic straps. For example, a loop 1 may be attached to a loop, a fastener, a longitudinally coaxial strap sheath 15–17 or a shield 20. A shield 20 may be used in combination with, or affixed to a longitudinally coaxial strap sheath 15–17, and any combination of these may contain permanently or removable attached components.

The loops or sheaths may, of course, be made of any suitable material, such as metal, plastic, wood, woven fibers, or a composite material. The preferred material for the loop is a soft, flexible, and durable material that is comfortable when pulled against the skin of the user. However, comfort is secondary to the protective function and the present invention encompasses any material, rigid or flexible, that may serve as a tether, sheath, or shield. An elastic strap with a woven cover is the presently preferred loop material. The preferred material for molded loops is a flexible and soft, yet durable, plastic. A flexible and durable plastic, or rubberized plastic is the preferred material for the sheaths. This material allows the sheath to bend around corners with the elastic strap, yet its resistance to compressive forces is sufficient to prevent undue compression of the sheath when exposed to a recoiling elastic strap. Further, it is durable enough to serve as a bumper to absorb the force of a speeding hook or fastener.

The invention therefore broadly encompasses the use of any material capable of serving the protective functions of the sheath or the loop. The examples provided are illustrations based on the favorable characteristics of the recited materials, but they are by no means limiting.

Having thus described the invention in connection with preferred embodiments thereof, it will be evident to those skilled in the art that various revisions and modifications of the illustrated embodiments can be made without departing from the spirit and scope of the invention. It is my intention, however, that all such revisions and modifications as are obvious to those skilled in the art will be included within the scope of the following claims.

What is claimed is as follows:

1. A safe elastic strap for protecting a user who grasps the strap with a hand to extend the strap or to release an already extended strap, the safe elastic strap comprising:

an elastic strap that tends to retract when extended;

a loop combined with the elastic strap through which loop a user's hand can extend to grasp the strap; and a fixed, loop-attachment means for combining the loop with the elastic strap.

2. The safe elastic strap of claim 1 further comprising:

at least one elastic strap end;

a strap fastener combined with the elastic strap near the elastic strap end;

the loop being combined with the elastic strap near the elastic strap end.

3. The safe elastic strap of claim 1 wherein the fixed, loop-attachment means comprises a crimping device.

4. The safe elastic strap of claim 1 wherein the fixed, loop-attachment means comprises a knot.

5. A safe elastic strap for protecting a user who grasps the strap with a hand to extend the strap or to release an already extended strap, the safe elastic strap comprising:

an elastic strap that tends to retract when extended;

a strap fastener combined with the elastic strap; and a separate loop combined with the strap fastener, said loop being adapted to receive a user's hand and said loop being adapted to generally maintain its dimensions when the strap is exposed to increasing tensile load.

6. The safe elastic strap of claim 1 or 5 wherein the loop is semi-rigid.

7. The safe elastic strap of claim 1 or 5 wherein the loop is rigid.

8. A safety device for use in combination with an elastic strap that tends to retract when extended and that a user grasps with a hand to extend or release, said safety device comprising:
- a loop for tethering the elastic strap, said loop being adapted to receive a user's hand; and
- a fixed, loop-attachment means for combining the loop with the elastic strap.

9. The safety device of claim 8 wherein the loop is semi-rigid.

10. The safety device of claim 8 wherein the loop is rigid.

11. A safety device for use in combination with an elastic strap that tends to retract when extended and that a user grasps with a hand to extend or release, said safety device comprising:
- a separate loop for tethering the elastic strap, said loop being adapted to receive a user's hand; and wherein a secondary fastener is combined with the loop.

12. The safety device of claim 11 wherein the secondary loop fastener comprises a pincer type fastener.

13. The safety device of claim 11 wherein the secondary loop fastener comprises a C-clamp type fastener.

14. The safety device of claim 11 wherein the secondary loop fastener comprises a hook type fastener.

15. The safety device of claim 11 wherein the secondary loop fastener comprises a suction cup type fastener.

16. The safety device of claim 11 wherein the secondary loop fastener comprises a strap having an opening and a protrusion securably insertable in the opening.

* * * * *